United States Patent [19]
Yoneda

[11] Patent Number: 5,979,127
[45] Date of Patent: Nov. 9, 1999

[54] EARTHQUAKE-PROOF OBJECT SUPPORT DEVICE

[76] Inventor: Ryozo Yoneda, 3-27-9 Koenjikita, Suginami-ku, Tokyo-To, Japan

[21] Appl. No.: 08/938,391

[22] Filed: Sep. 26, 1997

[30] Foreign Application Priority Data

Oct. 4, 1996 [JP] Japan .................................. 8-281646

[51] Int. Cl.$^6$ ................................ E04H 9/02; E04B 1/98
[52] U.S. Cl. ...................... 52/167.5; 52/167.1; 52/167.4; 248/638
[58] Field of Search ................................ 52/167.5, 167.1, 52/167.2, 167.3, 167.4, 167.6, 167.8, 167.9; 248/188.8, 188.9, 638

[56] References Cited

U.S. PATENT DOCUMENTS

| | | | |
|---|---|---|---|
| 2,002,934 | 5/1935 | Collins | 52/167.5 |
| 2,014,643 | 9/1935 | Bakker | 52/167.5 |
| 2,064,791 | 12/1936 | Faber | 52/167.5 |
| 2,828,589 | 4/1958 | Hercik | 52/167.5 X |
| 3,347,002 | 10/1967 | Penkuhn | 52/167.4 |
| 4,881,350 | 11/1989 | Wu | 52/167 R |
| 4,883,250 | 11/1989 | Yano et al. | 248/638 |
| 4,974,378 | 12/1990 | Shustov | 52/167.5 |
| 5,071,261 | 12/1991 | Stuve | 384/36 |
| 5,081,806 | 1/1992 | Pommelet | 52/167 R |
| 5,261,200 | 11/1993 | Sasaki | 52/167 RS |
| 5,689,919 | 11/1997 | Yano | 52/167.5 X |

*Primary Examiner*—Carl B. Friedman
*Assistant Examiner*—Jennifer I. Thissell
*Attorney, Agent, or Firm*—Lackenbach Siegel Marzullo Aronson & Greenspan, P.C.

[57] ABSTRACT

An earthquake-proof object support device comprising, a sphere of a material having strength high enough to support an object to be supported, and a support frame holding said sphere for supporting said object. At least three devices of the present invention are secured to the bottom of an object to be supported and placed on a flat floor. The devices are attached as legs to a large-scaled computer, for instance and placed on the floor of an office building. The object supported by the devices of the present invention stays at its initial position in accordance with the law of inertia when an earthquake occurs, and horizontal motions of the floor of the building are absorbed by the devices of the present invention. A vertical seismic force is transmitted to the supported object but the object is stably held horizontally as is the case with an object in a vertically moving elevator.

5 Claims, 5 Drawing Sheets

EARTHQUAKE-PROOF OBJECT SUPPORT DEVICE

BACKGROUND OF THE INVENTION

The present invention relates to an earthquake-proof object support device for supporting an object without transmitting thereto a horizontal force by an earthquake.

In view of devastating damage by the Great Hanshin Earthquake in Japan, there is a growing tendency to reconsider earthquake-resisting construction of buildings from the viewpoint of disaster prevention. And there have been studied and gone into actual use an earthquake-resisting structure designed to withstand earthquakes, an earthquake-free or aseismatic structure designed to minimize the influence of earthquake motion and an anti-seismic damping structure designed to artificially control the motion of a building that is caused by an earthquake.

However, anti-seismic measures taken so far are intended primarily for buildings and, as regards earthquake-resisting support means for various devices and equipment disposed indoors, there are available only furniture holders which prevent bureaus and similar furniture from being toppled over when an earthquake occurs.

SUMMARY OF THE INVENTION

An object of the present invention is to provide an earthquake-proof object support device which absorbs horizontal seismic motions to ensure stably, indoors or outdoors, supporting objects including buildings.

To attain the above object, the earthquake-proof object support device according to the present invention comprises:

a sphere of a material having strength high enough to support an object to be supported, and a support frame holding said sphere for supporting said object;

wherein said support frame has an object support surface on one side for supporting said object and a tubular part disposed on the other side opposite to said object support surface for holding said sphere;

wherein said tubular part has an inner wall transverse sectional configuration slightly larger than an outer circular configuration of a section passing through the center of said sphere and a tubular receiving hole having a depth smaller than the diameter of said sphere;

wherein the inner wall of a lower end portion of said tubular receiving hole has retaining means for preventing said sphere held in said receiving hole from falling out therefrom; and wherein an inner upper end face of said tubular receiving hole on the other side opposite to said object support surface has a recess so that a marginal edge of said recess makes support contact with an upper end portion of said sphere in a manner to produce therebetween a kinetic frictional force.

At least three devices of the present invention are secured to the bottom of an object to be supported and placed on a flat floor. That is, the devices are attached as legs to a large-scaled computer, for instance and placed on the floor of an office building.

The object supported by the devices of the present invention stays at its initial position in accordance with the law of inertia when an earthquake occurs, and horizontal motions of the floor of the building are absorbed by the devices of the present invention. A vertical seismic force is transmitted to the supported object but the object is stably held horizontally as is the case with an object in a vertically moving elevator.

BRIEF DESCRIPTION OF DRAWINGS

The present invention will be described in details below with reference to the accompanying drawings, in which.

DETAILED DESCRIPTION

Figure 1:
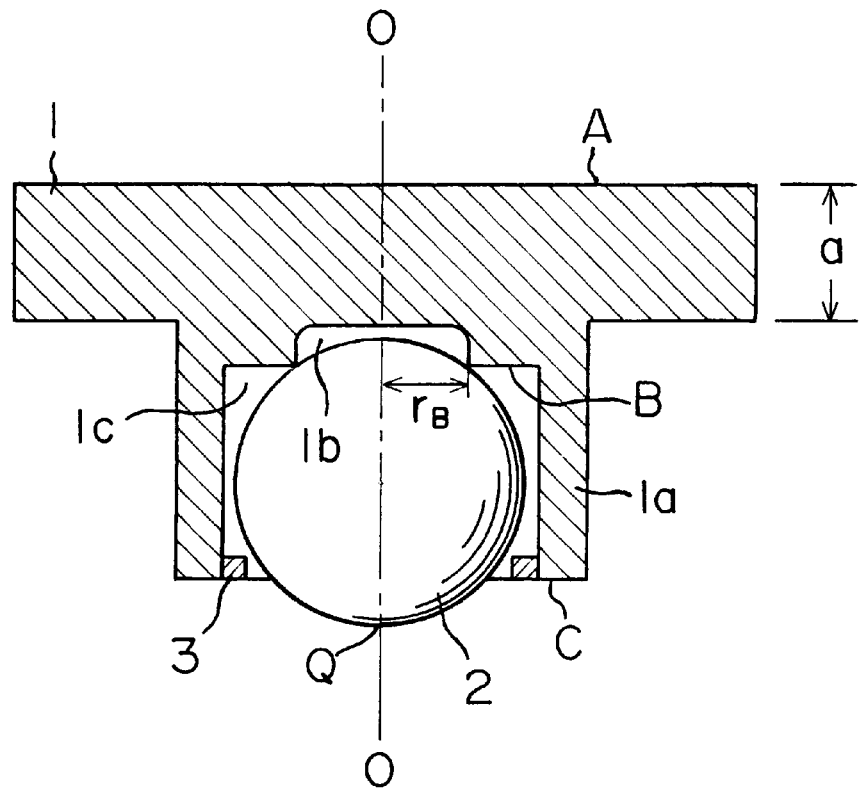
FIG. 1 is a longitudinal sectional view showing an example of the construction of the device of the present invention.
Figure 2:
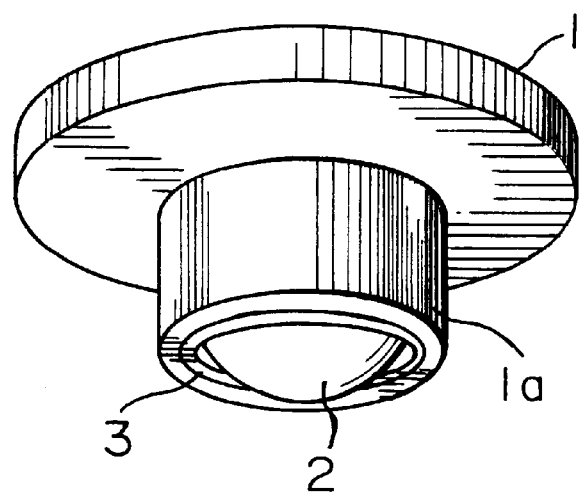
FIG. 2 is an obliquely upward perspective view showing an example of the construction of the device of the present invention.

The device of the present invention is composed of three parts 1, 2 and 3 as shown in FIGS. 1 and 2 which are a longitudinal section and a perspective view of the device, respectively. Reference numeral 1 denotes a support frame that has its center along an imaginary axis 0—0. When the device of the present invention secured to an object is placed on a floor, the axis 0—0 is vertical thereto. A portion a on which an object to be supported is mounted may be shaped as desired. In this example, a surface A perpendicular to the axis 0—0 is assumed. The surface A and the object to be supported can be joined by welding, with bolts, or by some other means. The support frame 1 has, on its underside opposite to the top surface A, a cylindrical (tubular) portion 1a with its center axis held in alignment with the axis 0—0, i.e. coaxially with the support frame 1. The inner top end face B of the cylindrical part 1a has therein a circular recess 1b of a radius $r_B$ about the axis 0—0. In the inside surface of the lower end portion C of the cylindrical part 1a there is cut a female screw not shown.

Reference numeral 2 denotes a sphere received in a hole (a cylindrical sphere receiving hole 1c) of the cylindrical part 1a. Letting the radius of the sphere 2 be represented by $r_0$, the following relationship (1) holds.

$$r_0 \sin\theta < -r_B < r_0 \qquad (1)$$

(where θ is an angle of friction between the marginal edge of the circular recess 1b and the sphere 2.)

The sphere 2 received in the hole 1c partly projects out therefrom downward of the lower end C of the cylindrical part 1a as shown in FIG. 1. Reference numeral 3 denotes a retaining ring for holding or retaining the sphere 3 in the cylindrical part 1a, the inside diameter of the retaining ring 3 being smaller than the diameter $2r_0$ of the sphere 2. In the cylindrical part 1a the sphere 2 is free.

When the device of the present invention secured to an object to be supported is placed on a floor, the sphere 2 makes contact with the floor at a point Q and with the support frame 1 only at the marginal edge of the circular recess 1b of the radius $r_B$ in the inner top end face B of the cylindrical part 1a.

Figure 3A:
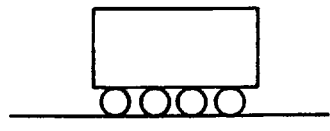
FIGS. 3A and 3B are schematic diagrams explanatory of the operations of the device of the present invention.
Figure 3B:
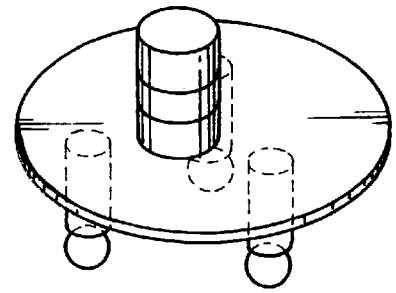

In general, a sphere placed on a floor and an object mounted thereon bear two relationships shown in FIGS. 3A and 3B. FIG. 3A shows an object on a known bearing. In FIG. 3B an object is mounted on spheres via cylindrical members. A description will be given of movements of one of the spheres in FIG. 3B.

The weight W of the object is exerted on the sphere 2 via the cylindrical part 1a of the support frame 1.

Figure 4:
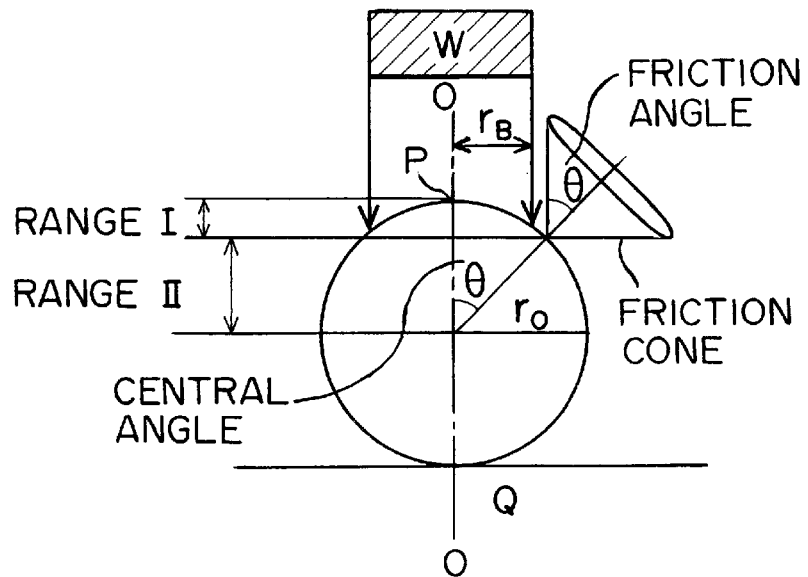
FIG. 4 is a schematic diagram explanatory of the operation of the device of the present invention.
Figure 5A:
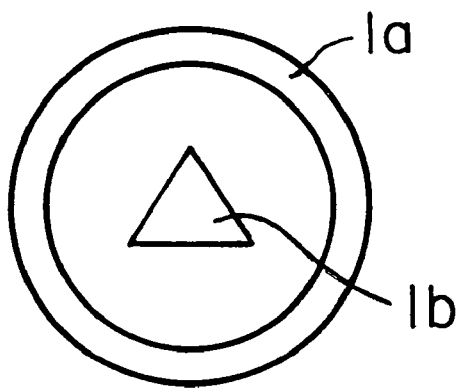
FIGS. 5(a)–5(d) are inner bottom views showing tubular members for use in the present invention and modifications of a recess.
Figure 5B:
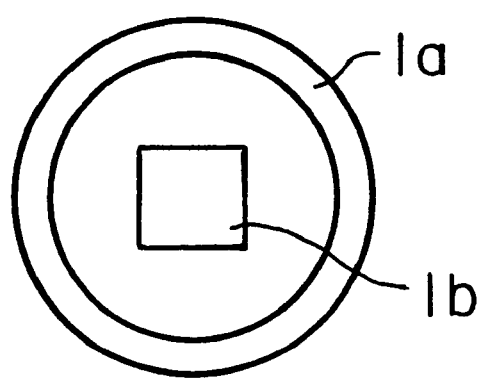
Figure 5C:
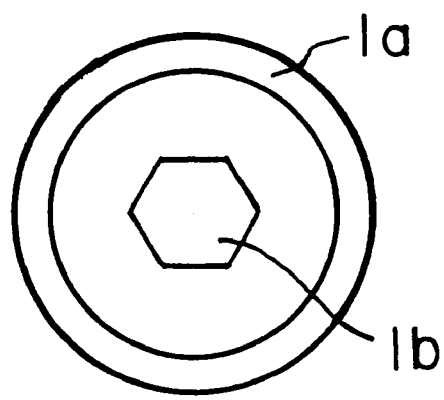
Figure 5D:
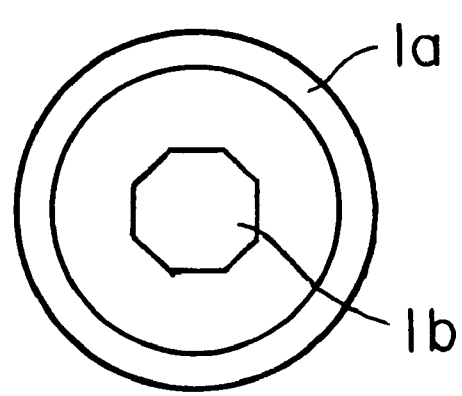

It is on the point of contact between the center axis inclined at a central angle θ to the axis 0—0 and the sphere surface, as depicted in FIG. 4, that the ridge of a friction cone calculated from the angle of friction θ between the surface of the sphere 2 and the marginal edge of the circular recess 1b is normal to the sphere 2. In FIG. 4, a statical frictional force acts between the marginal edge of the circular recess 1b and the sphere 2 in a range I in which the radius $r_B$ of the circular recess 1b meets the following condition (2).

$$0 < r_B \leq r_0 \sin\theta \quad (2)$$

That is, the weight of the object being supported, which is on the sphere 2 via the cylindrical part 1a, is applied thereto in the friction cone on the sphere 2, producing a statical frictional force Fs. When the floor moves horizontally owing to an earthquake, the sphere 2 tends to roll but the statical frictional force between the marginal edge of the circular recess 1b and the sphere 2 arrests or limits the rolling motion of the sphere 2.

In a range II in which the radius $r_B$ of the circular recess 1b satisfies the following condition (3), however, the sphere 2 is always slippery on the marginal edge of the circular recess 1 b.

$$r_0 \sin\theta < r_B < r_0 \quad (3)$$

That is, the weight of the object being supported, which is applied to the sphere 2 via the cylindrical part 1b, is a force that is applied thereto outside the friction cone; hence, the sphere 2 always tends to slide. A kinetic frictional force Fk is produced at the point of contact between the marginal edge of the circular recess 1b and the sphere 2. When the floor moves horizontally due to an earthquake, the sphere 2 rolls. The sphere 2 slides at its point of contact with the marginal edge of the circular recess 1b. That is, the object of the weight W stays still through the law of inertia and the displacement of the floor is absorbed by the rolling of the sphere 2.

According to the present invention, the radius $r_B$ of the recess 1b is set within the above-mentioned range II. In this instance, the positions of contact between the sphere 2 and the marginal edge of the recess 1b need not always be in the same horizontal plane but they may bear any positional relationship as long as the support frame 1 with an object supported thereon is allowed to assume a stable position on the sphere 2.

Figure 6A:
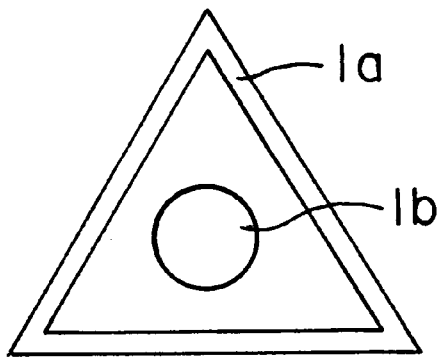
FIGS. 6(a)–6(d) are inner bottom views showing tubular members for use in the present invention and modifications of a recess.
Figure 6B:
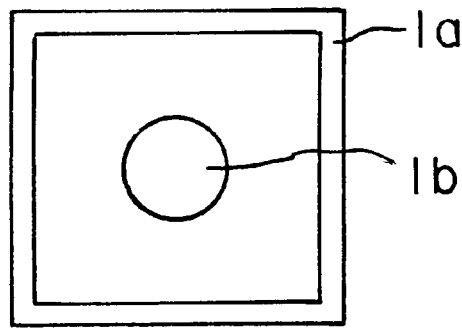
Figure 6C:
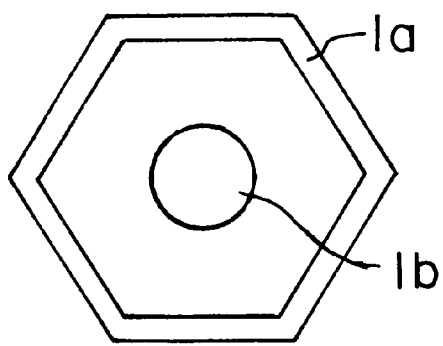
Figure 6D:
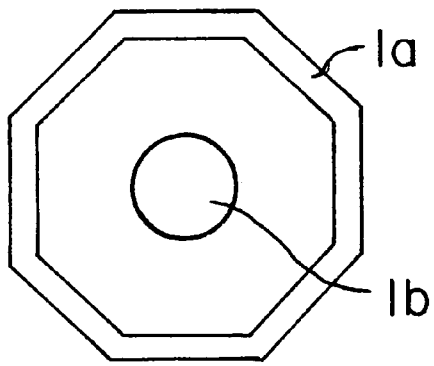
Figure 7A:
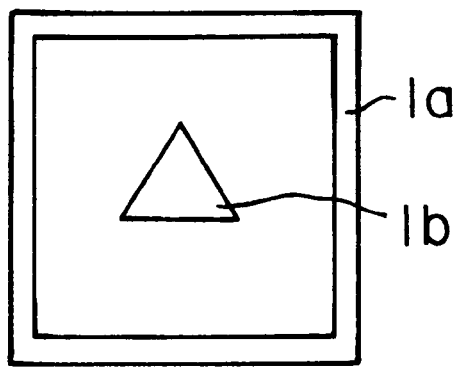
FIGS. 7(a)–7(d) are inner bottom views showing tubular members for use in the present invention and modifications of a recess.
Figure 7B:
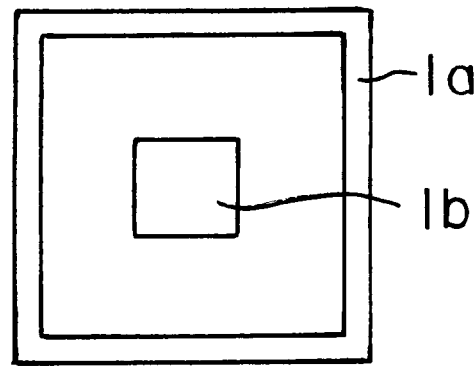
Figure 7C:
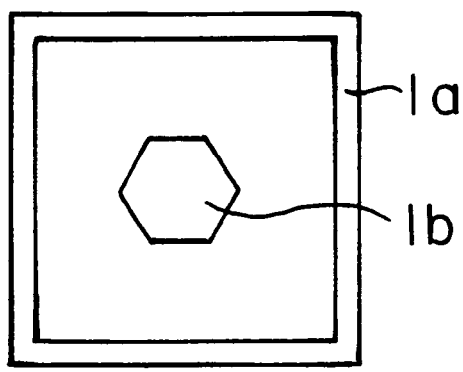
Figure 7D:
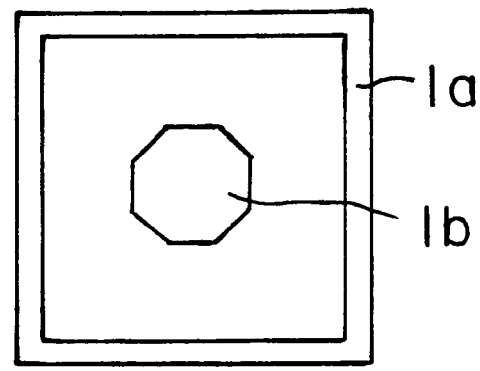

While in the above the tubular part 1a of the support frame 1 has been described to be cylindrical, the tubular part 1a is not limited specifically to the cylindrical configuration but may also be triangular, square, or polygonal such as hexagonal, octagonal and similar angled tubular configurations as shown in FIGS. 6(a), (b), (c) and (d), and any other configurations can be used as long as they have the hole 1c for stably receiving the sphere 2.

The configuration of the recess 1b is not limited specifically to the exemplified circular configuration either but may also be desired configurations such as triangular, square, or polygonal such as hexagonal, octagonal and similar angled tubular configurations shown are in FIGS. 5(a), 5(b), 5(c), and 5(d). FIGS. 7(a), 7(b), 7(c), and 7(d) show combinations of the square tubular part 1a with triangular, square, or polygonal, such as hexagonal and octagonal recesses.

While in the above the device of the present invention supporting a computer or similar object has been described to be placed on the floor of a room, the device of the present invention is not limited specifically thereto but may also be applied to constructions or buildings outdoors. In such an instance, it is necessary to increase the size of the device and the number of devices used so as to support the weight of such a construction or building. In the outdoor application of the device of the present invention, the foundation structure on which the device is placed needs to have a flat area wide enough to cover a limited area over which the sphere 2 rolls owing to a horizontal force of an earthquake.

As described in detail above, the device of the present invention is very simple-structured and effectively absorbs the horizontal vibrations when an earthquake occurs, and hence it ensures stably supporting the object mounted thereon. Thus, the device of the present invention is of great utility in practical use as an earthquake-proof device for precision gear or equipment such as a computer, valuable works of art, general housing and so on.

What I claim is:

1. An earthquake-proof object support device comprising:
   a sphere or ball of a material having sufficient strength to support an object, and a support frame holding said sphere for supporting said object;
   said support frame has an object support surface on one side for supporting said object and a tubular part disposed on the other side opposite to said object support surface for holding said sphere;
   said tubular part has an inner wall transverse sectional configuration slightly larger than an outer circular configuration of a section passing through the center of said sphere and a tubular receiving hole having a depth smaller than the diameter of said sphere;
   the inner wall of a lower end portion of said tubular receiving hole has retaining means for preventing said sphere held in said receiving hole from falling out therefrom; and
   an inner upper end face of said tubular receiving hole on the other side opposite to said object support surface has a recess so that a marginal edge of said recess makes support contact with an upper end portion of said sphere in a manner to produce therebetween a kinetic frictional force, wherein said sphere or ball rotates on a supporting surface when an earthquake occurs, so that horizontal motions of the supporting surface during an earthquake are absorbed by the rotation of said sphere or ball.

2. An earthquake-proof object support device according to claim 1, in which said tubular part has a cylindrical shape.

3. An earthquake-proof object support device according to claim 1, in which said tubular part has an angled tubular shape.

4. An eathquake-proof object support device according to any one of claims 1, 2, and 3, in which the marginal edge of said recess has a circular shape.

5. An earthquake-proof object support device according to any one of claims 1, 2, and 3, in which the marginal edge of said recess has a polygonal shape.

* * * * *